United States Patent
Ichikawa et al.

(10) Patent No.: US 11,491,873 B2
(45) Date of Patent: Nov. 8, 2022

(54) PROJECTION DISPLAY DEVICE

(71) Applicant: Yazaki Corporation, Tokyo (JP)

(72) Inventors: Junichi Ichikawa, Susono (JP); Takuma Ogisu, Susono (JP); Tetsuya Sugiyama, Susono (JP)

(73) Assignee: YAZAKI CORPORATION, Tokyo (JP)

(*) Notice: Subject to any disclaimer, the term of this patent is extended or adjusted under 35 U.S.C. 154(b) by 69 days.

(21) Appl. No.: 16/926,212

(22) Filed: Jul. 10, 2020

(65) Prior Publication Data
US 2020/0338987 A1   Oct. 29, 2020

Related U.S. Application Data

(63) Continuation of application No. PCT/JP2019/000566, filed on Jan. 10, 2019.

(30) Foreign Application Priority Data

Feb. 14, 2018   (JP) .............................. JP2018-023902

(51) Int. Cl.
   *B60K 35/00*   (2006.01)
(52) U.S. Cl.
   CPC ........ *B60K 35/00* (2013.01); *B60K 2370/122* (2019.05); *B60K 2370/1529* (2019.05); *B60K 2370/23* (2019.05); *B60K 2370/334* (2019.05); *B60K 2370/785* (2019.05)

(58) Field of Classification Search
   CPC ............ B60K 35/00; B60K 2370/1529; B60K 2370/122; B60K 2370/23; B60K 2370/334; B60K 2370/785
   See application file for complete search history.

(56) References Cited

U.S. PATENT DOCUMENTS

| 5,775,661 | A  | * | 7/1998  | Matsumoto | .......... B60N 2/1803 |
|           |    |   |         |           | 248/421 |
| 9,726,886 | B1 | * | 8/2017  | Kuo ..................... G02B 27/0101 |
| 10,871,655 | B2 | * | 12/2020 | Nagano ................... B60K 35/00 |

(Continued)

FOREIGN PATENT DOCUMENTS

| CN | 106461948 A | 2/2017 |
| JP | 11-23997 A  | 1/1999 |

(Continued)

*Primary Examiner* — Chico A Foxx
(74) *Attorney, Agent, or Firm* — Sughrue Mion, PLLC

(57) ABSTRACT

A projection display device includes a display device, an optical system, and a shielding plate. The optical system includes a first mirror and a second mirror provided on the regular optical path, the second mirrors being to provide an optical path convergence point on the regular optical path, and the first mirrors being provided at a position corresponding to the optical path convergence point. The projection display device is configured such that a position of a mirror surface of the first mirror and the second mirror is adjustable in accordance with a position of an eye point of a user so as to project the light toward the projection position that corresponds to the position of the eye point. The shielding plate is provided such that the shieling plate does not interfere with the regular optical path and such that the shielding plate interferes with the different optical path.

9 Claims, 4 Drawing Sheets

(56) References Cited

U.S. PATENT DOCUMENTS

| | | | |
|---|---|---|---|
| 2006/0203351 A1* | 9/2006 | Kageyama | G02B 27/0101 359/630 |
| 2008/0231090 A1* | 9/2008 | Takeda | B60N 3/063 297/83 |
| 2009/0135374 A1* | 5/2009 | Horiuchi | H04N 9/3129 353/13 |
| 2010/0066984 A1* | 3/2010 | Horiuchi | G03B 21/208 353/97 |
| 2011/0068608 A1* | 3/2011 | Ohtsubo | B60N 2/0252 296/193.07 |
| 2011/0157709 A1* | 6/2011 | Togino | G02B 17/008 359/643 |
| 2015/0092118 A1* | 4/2015 | Hada | G02B 27/01 349/11 |
| 2015/0331239 A1* | 11/2015 | Ando | G02B 26/10 359/631 |
| 2016/0320624 A1 | 11/2016 | Yamaoka | |
| 2017/0084056 A1* | 3/2017 | Masuya | G09F 19/18 |
| 2017/0115485 A1 | 4/2017 | Saito et al. | |
| 2017/0225568 A1 | 8/2017 | Kasahara et al. | |
| 2017/0235138 A1* | 8/2017 | Morohashi | H04N 9/3141 359/631 |
| 2017/0285338 A1 | 10/2017 | Narushima et al. | |
| 2017/0299922 A1* | 10/2017 | Matsuura | B60K 35/00 |
| 2017/0351090 A1* | 12/2017 | Sekiya | G02B 27/0189 |
| 2018/0015876 A1* | 1/2018 | Yamagata | B60Q 3/12 |
| 2018/0178678 A1* | 6/2018 | Ishikawa | B60N 2/02 |
| 2019/0011712 A1* | 1/2019 | Nagano | G09G 3/001 |
| 2019/0084419 A1* | 3/2019 | Suzuki | G02B 27/0101 |
| 2019/0107714 A1* | 4/2019 | Ishihara | H04N 9/3129 |
| 2019/0121128 A1 | 4/2019 | Kasahara et al. | |
| 2019/0146217 A1* | 5/2019 | Yamamura | G02B 27/0101 345/7 |
| 2019/0162961 A1* | 5/2019 | Yokoe | G02B 5/28 |
| 2019/0210526 A1* | 7/2019 | Takiguchi | G02B 5/09 |
| 2019/0258059 A1* | 8/2019 | Takahashi | G02B 27/0101 |
| 2020/0026073 A1* | 1/2020 | Nambara | G02B 27/286 |
| 2020/0183157 A1* | 6/2020 | Suzuki | G02B 27/01 |
| 2020/0218071 A1* | 7/2020 | Aoki | G02B 27/0149 |
| 2021/0291734 A1* | 9/2021 | Zafeirakis | B60R 1/025 |

FOREIGN PATENT DOCUMENTS

| | | |
|---|---|---|
| JP | 2004-258439 A | 9/2004 |
| JP | 2015-138175 A | 7/2015 |
| JP | 2015-225119 A | 12/2015 |
| JP | 2016-80860 A | 5/2016 |
| JP | 2017-173557 A | 9/2017 |
| JP | 2017-181644 A | 10/2017 |
| WO | 2017/183556 A1 | 10/2017 |

* cited by examiner

PROJECTION DISPLAY DEVICE

CROSS-REFERENCE TO RELATED APPLICATION

The present application is a continuation application of PCT/JP2019/000566 that claims priority to Japanese Patent Application No 2018-023902 filed on Feb. 14, 2018, the entire content of which is incorporated herein by reference.

TECHNICAL FIELD

The present invention relates to a projection display device including a display device, and an optical system configured to form an optical path projecting light emitted from the display device toward a predetermined projection position as a display image.

BACKGROUND

It is widely known to use a head-up display (HUD) device for a vehicle in order to improve visibility when a driver of a vehicle sees a display image such as a vehicle speed display and a guidance display of a navigation system (for example, see JP2017-173557A and JP2017-181644A).

In the HUD device for a vehicle, light projected from a display device is projected onto a projection position, such as a windshield, via an optical system including a plurality of optical members, and an optical path is formed by the light reflected at the projection position being directed toward an eye point of the driver. Accordingly, the driver can visually recognize the display image reflected on the windshield and the like as a virtual image while visually recognizing a scene in front of the vehicle through the windshield.

Generally, the eye point of the driver varies depending on the physique of the driver, a sealing position of the driver on a seat, and the like. Therefore, in the HUD device for a vehicle, for example, the optical system is designed to form various optical paths corresponding to the eye points being at various positions within a certain range such that the driver continuously be able to visually recognize the display image even if the eye points changes within the certain range. In order to design the optical system in which such various optical paths can be formed, for example, it may be conceivable to increase the size of the optical member in order to ensure a large incident range of each of the optical members (for example, mirrors) included in the optical system. However, when the size of the optical member is increased, the size of the entire HUD device is usually increased.

One object of the present invention is to provide a projection display device configured to cope with various eye points and with which the size of the device can be reduced.

SUMMARY (1) The above objects of the present invention are achieved by the following configurations (1) to (3). (1) A projection display device includes a display device, an optical system configured to form a regular optical path to project light toward a projection position as a display image, the light being emitted from the display device, and a shielding plate configured to prevent the light from reaching the projection position via a different optical path different from the regular optical path. The optical system includes a first mirror and a second mirror provided on the regular optical path, the second mirrors being configured to provide an optical path convergence point, at which the light converges, on the regular optical path, and the first mirrors being provided at a position corresponding to the optical path convergence point. The projection display device is configured such that a position of a mirror surface of at least one of the first mirror and the second mirror is adjustable in accordance with a position of an eye point of a user who visually recognizes the display image so as to project the light that has passed the optical path convergence point via the first mirror and the second mirror toward the projection position that corresponds to the position of the eye point. The shielding plate is provided such that the shieling plate does not interfere with the regular optical path between the first mirror and the second mirror and such that the shielding plate interferes with the different optical path along which the light travels toward the projection position without being reflected by the pair of mirrors.

(2) In the projection display device according to (1), the optical system further includes an optical member configured to perform an optical processing on the light at a position corresponding to the optical path convergence point.

(3) The projection display device according to (1) or (2) further includes at least one of a measuring unit configured to measure the position of the eye point without the user performing the measurement and an input unit configured to receive an input indicative of the position of the eye point, the input unit being to be operated by the user.

In the first aspect, even if the eye points changes for various reasons, by adjusting the position of the mirror surface of at least one of the pair of mirrors and by maintaining the other mirror at the position corresponding to the optical path convergence point provided by one of the mirrors, the display image can be continuously projected onto the projection position corresponding to the eye point. Furthermore, since the other mirror is always located at the position corresponding to the optical path convergence point regardless of the position of the eye point, the assumed range of light incident on the other mirror can be narrowed, and various optical paths can be formed without increasing the size of the other mirror. As a result, the size of the projection display device can be reduced.

In the projection display device according to the first aspect, it is possible to cope with various eye points and reduce the size of the device.

The position "corresponding" to the optical path convergence point may be the optical path convergence point itself or may be in the vicinity of the optical path convergence point within a range were the above-described effects can be exhibited.

In the second aspect, the optical member for performing the optical processing is disposed at the position corresponding to the optical path convergence point. Accordingly, the size of the optical member can be reduced for a reason similar to the reason why the size of the above-described other mirror can be reduced. As a result, an increase in the size of the projection display device due to the disposition of the optical member can be suppressed. As such an optical member, typically, a thermal cut-off filter, a cold mirror, and the like which are disposed on the optical path may be conceivable on the assumption that external sunlight travels backward along the optical path toward the display device.

In the third aspect, by automatically measuring the eye point by the measuring unit, the projection position of the display image can be automatically adjusted. Alternatively, the user can operate the input unit to manually adjust the projection position such that the display image is projected onto a projection position suitable for the eye point of the user.

According to the present invention, it is possible to cope with various eye points and reduce the size of the device.

The invention has been briefly described as above. Further, derails of the present invention will be further clarified by reading a mode (hereinafter, referred to as "embodiment") for carrying out tire invention to be described below with reference to accompanying drawings.

DETAILED DESCRIPTION

Figure 1:
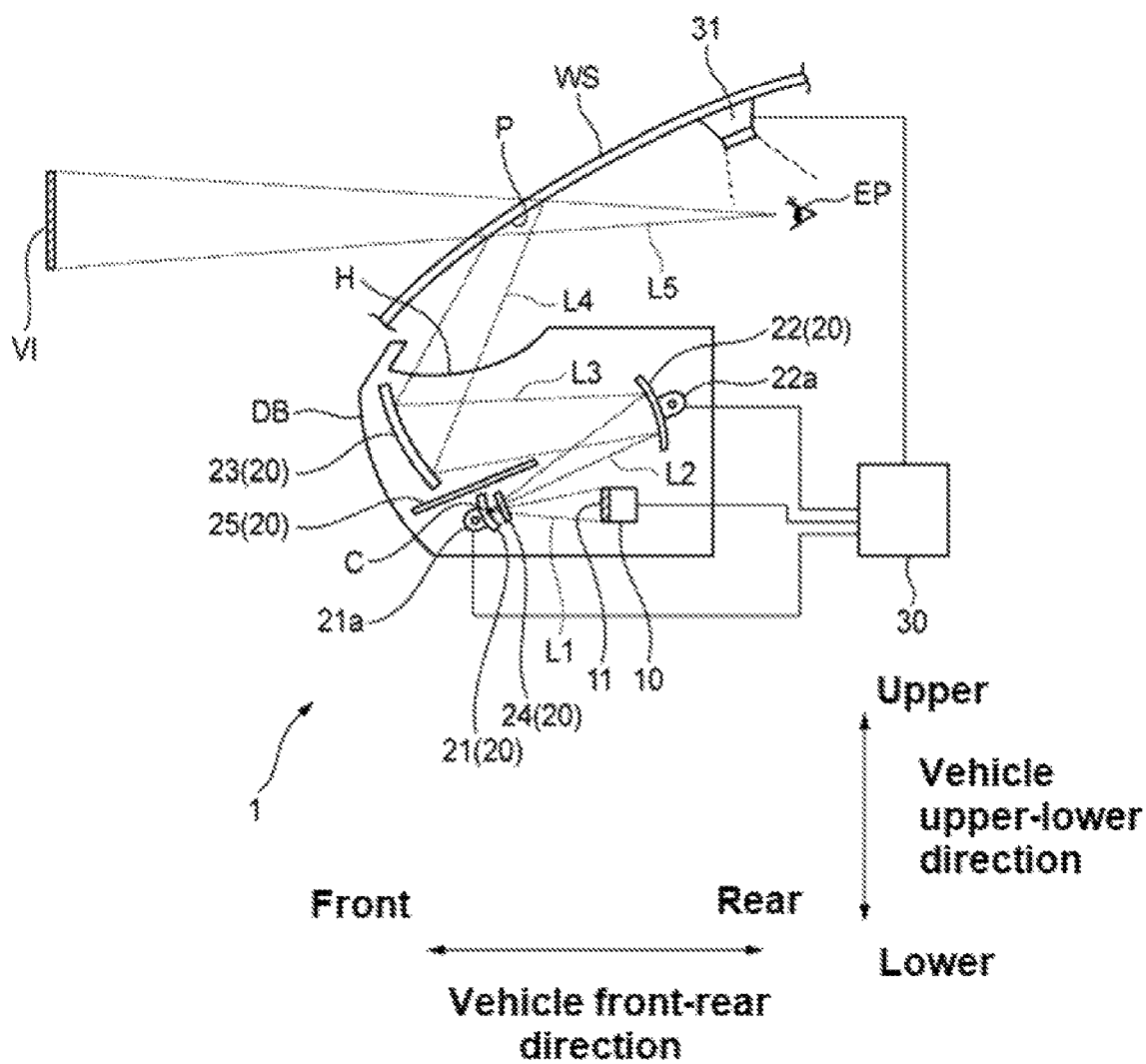
FIG. 1 is an external schematic view showing an outline of a configuration of an HUD device and optical paths according to an embodiment of the present invention.

Hereinafter an HUD device 1 (projection display device) for a vehicle according to an embodiment of the present invention will be described with reference to FIGS. 1, 2(a) to 2(c), 3 and 4. Hereinafter, as shown in FIG. 1, "vehicle front-rear direction", "vehicle upper-lower direction", "front", "rear", "upper", and "lower" are defined for convenience of description. The vehicle front-rear direction and the vehicle upper-lower direction are orthogonal to each other. Further, a direction (depth direction of paper in FIG. 1) orthogonal to the vehicle front-rear direction and the vehicle upper-lower direction is referred to as a "vehicle width direction".

As shown in FIG. 1, the HUD device 1 is configured to project light from an opening H formed on a portion of an upper surface of a dashboard DB of a vehicle onto a windshield WS of the vehicle. Typical examples of a display image include information useful for driving the vehicle (for example, a vehicle speed display and a guidance display of a navigation system).

The HUD device 1 includes a display device 10, an optical system 20, and a control device 30. The display device 10 and the optical system 20 are housed inside the dashboard DB of the vehicle. The control device 30 may be housed inside the dashboard DB or may be disposed outside the dashboard.

The display device 10 has a display surface 11 capable of displaying an arbitrary two-dimensional image. The display device 10 emits light from the display surface 11 toward a front of the vehicle. The display device 10 is disposed in the HUD device 1 in a fixed manner. Although a transmissive liquid crystal display panel is typically used as the display device 10, a projector having a screen at the position of the display surface 11 may also be used.

The optical system 20 includes a first concave mirror 21, a second concave mirror 22, a third concave mirror 23, a thermal cut-off filter 24, and a light shielding plate 25.

The first concave mirror 21 is located at a vehicle front side with respect to the display device 10, and includes an aspheric concave mirror surface facing a rear of the vehicle. The first concave mirror 21 is supported by the HUD device 1 so as to be rotatable upward and downward within a predetermined range around a rotation axis extending in the vehicle width direction and provided on a back side (opposite to the mirror surface) of the first concave mirror 21. The angle of the first concave mirror 21 can be arbitrarily adjusted by a first actuator 21a provided on the rear side thereof. The angle of the first concave mirror 21 shown in FIG. 1 indicates a standard angle in design within an adjustment range.

The second concave mirror 22 is located at a vehicle tear side and a vehicle upper side with respect to the display device 10, and includes an aspheric concave mirror surface facing the front of the vehicle. The second concave mirror 22 is supported by the HUD device 1 so as to be rotatable upward and downward within a predetermined range around a rotation axis extending in the vehicle width direction and provided on a back side (opposite to the mirror surface) of the second concave mirror 22. The angle of the second concave mirror 22 can be arbitrarily adjusted by a second actuator 22a provided on the tear side thereof. The angle of the second concave mirror 22 shown in FIG. 1 indicates a standard angle in design within an adjustment range.

The third concave mirror 23 is located at the vehicle front side and the vehicle upper side with respect to the first concave mirror 21 and directly below the opening H, and includes an aspheric concave mirror surface facing the tear of the vehicle. The third concave mirror 23 is disposed in the HUD device 1 in a fixed manner (non-rotatable manner).

The light emitted from the display surface 11 of the display device 10 toward the from of the vehicle travels an optical path (light beam) L1 toward the first concave mirror 21, the light incident on the mirror surface of the first concave mirror 21 is reflected by the mirror surface and travels an optical path (light beam) L2 toward the second concave mirror 22, the light incident on the mirror surface of the second concave mirror 22 is reflected by the mirror surface and travels an optical path (light beam) L3 toward the thud concave mirror 23, and the light incident on the mirror surface of the thud concave mirror 23 is reflected by the mirror surface, emitted through the opening H by traveling an optical path (light beam) L4, and projected at a projection position P on an inner surface (projection surface) of the windshield WS.

The light projected at the projection position P of the windshield WS is reflected by the projection surface of the windshield WS and travels an optical path (light beam) L5 toward an eye point EP of the driver. The eye point EP shown in FIG. 1 indicates a standard position in design of the eye point of the driver Therefore, the projection position P shown in FIG. 1 corresponding to the eye point EP shown in FIG. 1 indicates a standard position in design of the projection position.

The optical paths (light beams) L1 to L5 show standard optical paths in design through which light forming a display image that is visually recognized by the driver at the eye point EP passes. In these standard optical paths, for example, when seen from a second concave mirror 22 side, the optical path L2 converges at an optical path convergence point C which is one point on the mirror surface of the first concave mirror 21. In other words, the mirror surface of the first concave mirror 21 is located on the optical path convergence point C of the optical path L2 formed by the concave shape of the mirror surface of the second concave mirror 22.

The driver can visually recognize the display image projected by the HUD device 1 at the eye point EP. Actually, the display image visually recognized by the driver is formed as a virtual image VI at a predetermined position further forward than the windshield WS.

In the example shown in FIG. 1, the light emitted by the HUD device 1 is reflected by the projection surface of the windshield WS and guided to the eye point EP, but an optical reflecting member such as a combiner, a half mirror and the like may be used instead of the windshield WS, and the light emitted by the HUD device 1 may be reflected on a projection surface of these optical reflecting members and guided to the eye point EP.

The thermal cut-off filter 24 is disposed in the HUD device 1 in a fixed manner at a position in the vicinity of the first concave mirror 21 and on the optical path L2 between the first concave mirror 21 and the second concave mirror 22 (that is, in the vicinity of the optical path convergence point C of the optical path L2). The thermal cut-off filter 24 is a filter having a characteristic of transmitting light emitted from the display device 10 and blocking sunlight. The thermal cut-off filter 24 is provided to prevent the display device 10 from being excessively heated by the heat of the sunlight, the sunlight from the outside traveling backward along the optical paths L4, L3, L2, and L1 toward the display device 10.

Figure 4:
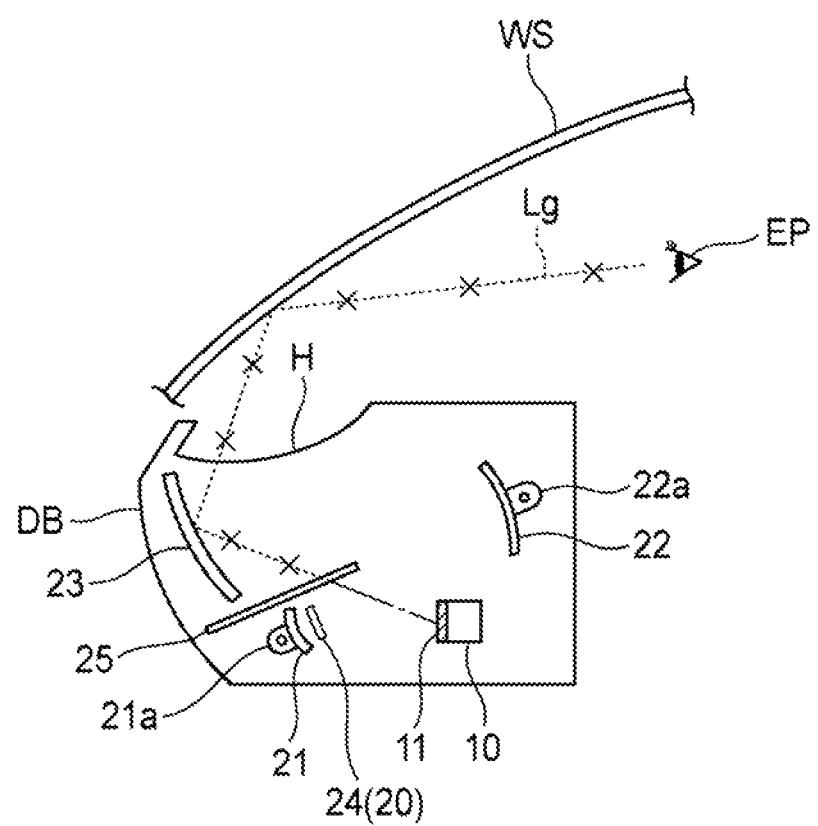
FIG. 4 is a view corresponding to FIG. 1 for showing a function of a light shielding plate shown in FIG. 1.

The light shielding plate 25 is disposed in the HUD device 1 in a fixed manner at a position and with an orientation such that the light shielding plate 25 does not interfere with the optical paths L2, L3 between the first concave mirror 21 and the third concave mirror 23. As shown in FIG. 4, the light shielding plate 25 is provided to prevent the driver from visually recognizing an image (so-called ghost image) different from the regular display image, the image being formed by allowing the light emitted from the display device 10 to reach the eye point EP through a different optical path Lg, which is different from the regular optical paths L1, L2, L3, L4, and L5.

As described above, the optical path L2 of the present embodiment converges at the optical path convergence point C, which is one point on the mirror surface of the first concave mirror 21, and the mirror surface of the first concave mirror 21 is located on the optical path convergence point C. That is, the width of tire optical path L2 becomes narrower toward the first concave mirror 21. Therefore, the degree of freedom of disposition of the light shielding plate 25 is improved, and an increase in the size of the entire HUD device 1 is suppressed.

Further, the light shielding plate 25 also has a function of blocking sunlight from the outside so as to prevent the display device 10 from being exposed to sunlight. As described above, in the HUD device 1, the optical path L2 is converged between the first concave mirror 21 and the second concave mirror 22. The convergence of the optical path L2 provides an additional room inside the HUD device 1. This additional room can be used to increase the size of the light shielding plate 25. By increasing the size of the light shielding plate 25, the sunlight reaching the display device 10 can be more reliably shielded.

As shown in FIG. 1, the control device 30 is electrically connected to the display device 10, the first actuator 21a, the second actuator 22a, and an eye point measurement camera 31, the eye point measurement camera 31 being provided at a predetermined position which is on an upper side of the inner surface of the windshield WS. The control device 30 is, for example, a microcomputer. The eye point measurement camera 31 is a camera capturing an image around the face (eyes) of the driver in order to measure the position of the eye point EP of the driver.

The control device 30 displays various images on the display surface 11 of the display device 10 according to a state of the vehicle. In other words, the control device 30 controls the light emitted from the display device 10. The control device 30 adjusts the angle of the first concave mirror 21 by controlling the first actuator 21a. The control device 30 adjusts the angle of the second concave mirror 22 by controlling the second actuator 22a. The control device 30 analyzes the image captured by the eye point measurement camera 31 and measures the position of the eye point EP of the driver.

Next, the adjustment of the angles of the first concave mirror 21 and the second concave mirror 22 according to the position of the eye point EP will be described with reference to FIGS. 2A to 2C. The positions of the eye points EPs changes depending on, for example, the physique of the driver. When the eye points EPs changes, the projection positions P corresponding to the eye points EPs on the projection surface of the windshield WS also changes.

Figures 2A, 2B:
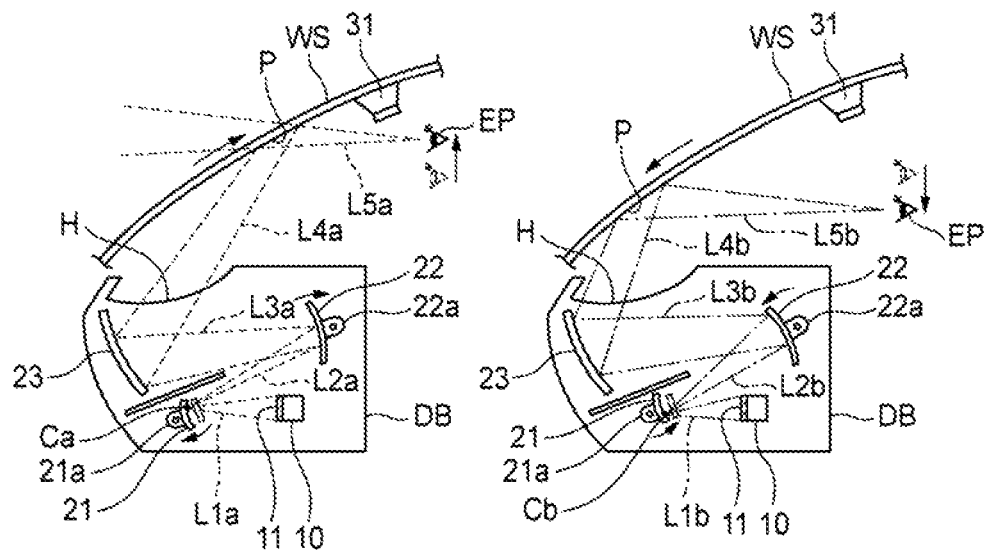
FIG. 2A is a view corresponding to FIG. 1 showing adjustment of directions of mirror surface angles for a first concave mirror and a second concave mirror and optical paths when an eye point moves upward.
FIG. 2B is a view corresponding to FIG. 1 showing adjustment of directions of the mirror surface angles of the first concave mirror and the second concave mirror and optical paths when the eye point moves downward.

Specifically, as shown in FIG. 2A, when the eye point EP is located at a position moved upward from the standard position shown in FIG. 1, the projection position P corresponding to the eye point EP on the projection surface of the windshield WS also moves upward from the standard position shown in FIG. 1. As described above, in order to move the projection position P upward from the standard position shown in FIG. 1, the optical paths from the display device 10 to the projection surface of the windshield WS need to be changed from the standard optical paths L1, L2, L3, L4 and L5 shown in FIG. 1 to optical paths L1a, L2a, L3a, L4a and L5a shown in FIG. 2A.

In order to change the optical paths, as shown in FIG. 2A, the angles of the first concave mirror 21 and the second concave mirror 22 are changed from the standard angles shown in FIG. 1. In the example shown in FIG. 2A, the angle of the first concave mirror 21 is changed downward from the standard angle shown in FIG. 1, and the angle of the second concave mirror 22 is changed upward from the standard angle shown in FIG. 1.

Similarly to the optical path L2 shown in FIG. 1, the optical path L2a shown in FIG. 2A also converges at an optical path convergence point Ca which is one point on the mirror surface of the first concave mirror 21 when seen from the second concave mirror 22 side. At this time, as shown in FIG. 2C, the optical path convergence point Ca (see FIG. 2A) moves slightly upward from the optical path convergence point C (see FIG. 1) on the mirror surface of the first concave mirror 21.

On the other hand, as shown in FIG. 2B, when the eye point EP is located at a position moved downward from the standard position shown in FIG. 1, the projection position P corresponding to the eye point EP on the projection surface of the windshield WS also moves downward from the standard position shown in FIG. 1. As described above, in order to move the projection position P downward from the standard position shown in FIG. 1, the optical paths from the display device 10 to the projection surface of the windshield WS need to be changed from the standard optical paths L1, L2, L3, L4 and L5 shown in FIG. 1 to optical paths L1b, L2b, L3b, L4b and L5b shown in FIG. 2B.

In order to change the optical paths, as shown in FIG. 2B, the angles of the first concave mirror 21 and the second concave mirror 22 are changed from the standard angles shown in FIG. 1. In the example shown in FIG. 2B, the angle of the first concave mirror 21 is changed upward from the standard angle shown in FIG. 1, and the angle of the second concave mirror 22 is changed downward from the standard angle shown in FIG. 1.

Figure 2C:
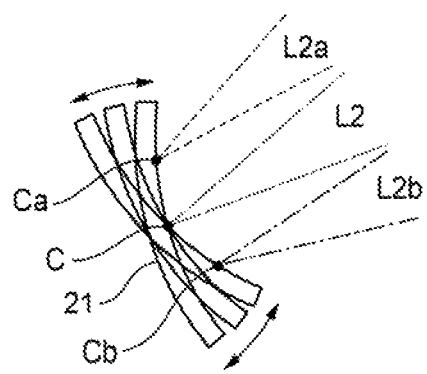
FIG. 2C is an enlarged view in which the first concave mirror and a periphery thereof shown in FIGS. 1, 2A, and 2B are overlapped and enlarged.

Similarly to the optical path L2 shown in FIG. 1, the optical path L2b shown in FIG. 2B also converges at an optical path convergence point Cb which is one point on the mirror surface of the first concave mirror 21 when viewed from the second concave mirror 22 side At this time, as shown in FIG. 2C, the optical path convergence point Cb (see FIG. 2B) moves slightly downward from the optical path convergence point C (sec FIG. 1) on the mirror surface of the first concave mirror 21.

Thus, in the HUD device 1, even if the eye point EP moves upward and downward within a certain range assumed in design, by changing the angles of the first concave mirror 21 and the second concave mirror 22, the state where the mirror surface of the first concave mirror 21 is located on the optical path convergence point of the optical path L2 generated by the second concave mirror 22 is maintained. As a result, the display image is projected onto the projection position P corresponding to the eye point EP on the projection surface of the windshield WS. Therefore, even if the eye point EP moves upward and downward within the range assumed in design, the driver can continue to visually recognize the display image.

Figure 3:
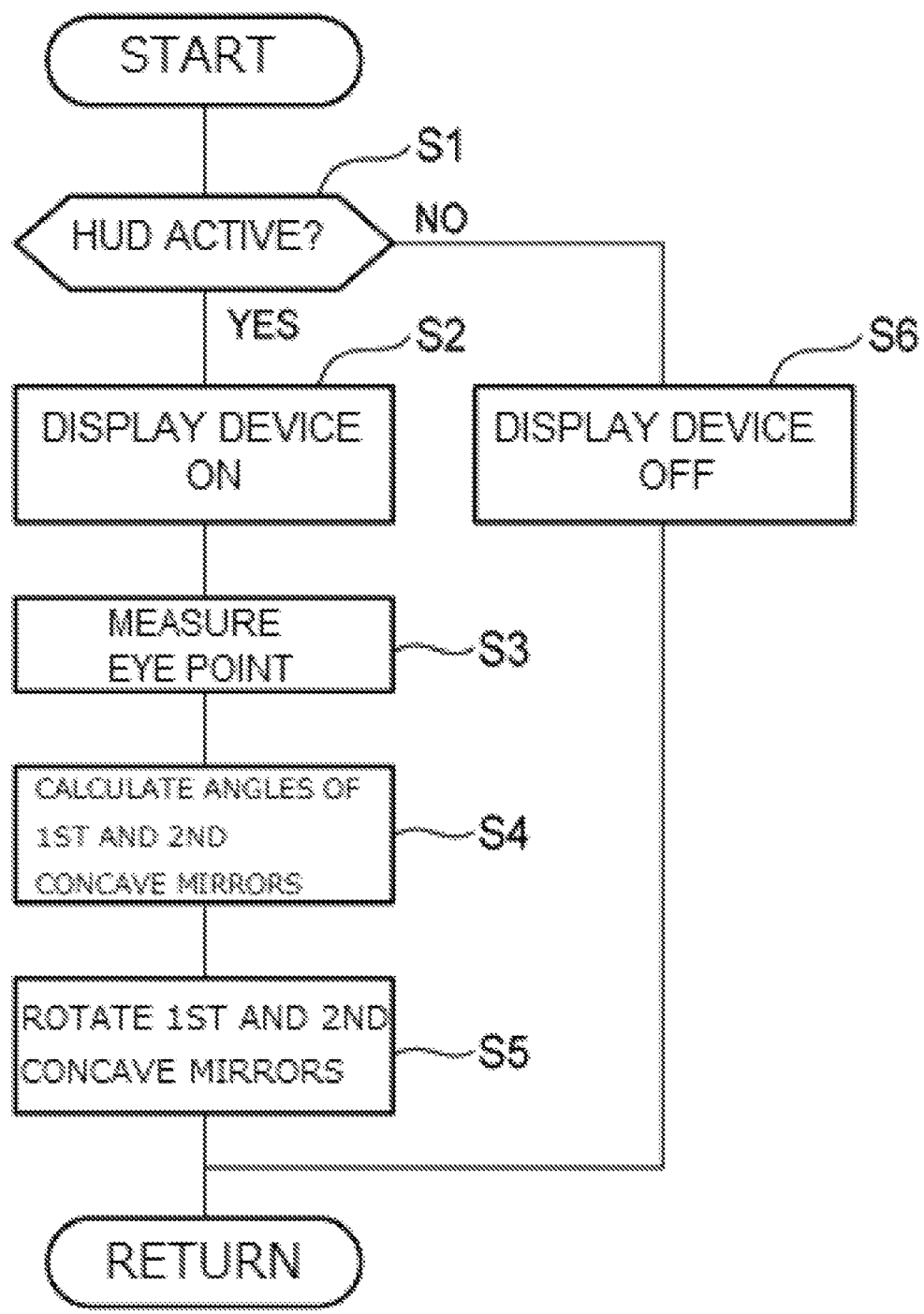
FIG. 3 is a flowchart showing an example of a flow of process executed by a control device shown in FIG. 1.

Next, a specific process flow when the control device 30 of the HUD device 1 adjusts the angles of the first concave mirror 21 and the second concave mirror 22 according to the position of the eye point EP will be described with reference to a flowchart shown in FIG. 3. The control device 30 repeatedly executes the process shown in FIG. 3 at a predetermined timing.

First, the control device 30 determines whether the HUD device 1 is in an operating state (step S1). When the HUD device 1 is not in the operating state (No in step S1), the control device 30 maintains the display device 10 in an OFF state (step S6). On the other hand, when the HUD device 1 is in the operating state (Yes in step S1), the control device 30 turns on the display device 10 (step S2).

Next, the control device 30 analyzes the image captured by the eye point measurement camera 31 using one of known methods, and measures the position of the eye point EP of the driver (step S3).

When the measurement of the position of the eye point EP is completed, the control device 30 calculates the angles of the first concave mirror 21 and the second concave mirror 22 according to the measured position of the eye point EP (step S4). The control device 30 controls the first actuator 21a and the second actuator 22a such dial actual angles of the first concave mirror 21 and the second concave mirror 22 coincide with the calculated angles (step S5). The adjustment of the angles of the first concave mirror 21 and the second concave mirror 22 is completed by the above process.

As a result of the above-described process by the control device 30, the display image is projected onto the projection position P corresponding to the eye point EP measured in step S2 while the state where the mirror surface of the first concave mirror 21 is located on the optical path convergence point C of the optical path L2 generated by the second concave mirror 22 is maintained.

As described above, according to the HUD device 1 according to the present embodiment, even if the eye point EP moves within the range assumed in design, by changing the angles of the first concave mirror 21 and the second concave mirror 22, the state where the mirror surface of the first concave mirror 21 is located at the optical path convergence point of the optical path L2 generated by the second concave mirror 22 is maintained. As a result, the display image is projected onto the projection position P corresponding to the eye point EP on the projection surface of the windshield WS. Therefore, even if the eye point EP moves within the range assumed in design, the driver continuously be able to visually recognize the display image.

In addition, even if the eye point EP moves within the range assumed in design, since the mirror surface of the first concave mirror 21 is always disposed on the optical path convergence point of the optical path L2, it is possible to narrow an assumed range of the light incident on the mirror surface of the first concave mirror 21. At this time, the first concave mirror 21 can be made extremely small by designing the optical system 20 such that intervals between the optical path convergence points C, Ca, and Cb shown in FIG. 2C are narrowed. As a result, it is possible to reduce the size of the entire HUD device 1.

Therefore, according to the HUD device 1, even if the eye point EP moves within the assumed range in design, the driver continuously be able to visually recognize the display image, and the size of the entire HUD device 1 can be reduced.

Further, the thermal cut-off filter 24 is disposed at the position in the vicinity of the first concave mirror 21 and on the optical path L2 between the first concave mirror 21 and the second concave mirror 22 (that is, in the vicinity of the optical path convergence point of the optical path). As a result, it is possible to narrow an assumed range of the light incident on the thermal cut-off filter 24. Therefore, it is possible to reduce the size of the thermal cut-off filter 24 for a same reason as the first concave mirror 21. As a result, an increase in the size of the entire HUD device 1 due to the disposition of the thermal cut-off filter 24 can be suppressed.

In the above embodiment, the first concave mirror 21, the second concave mirror 22, and the third concave mirror 23 are aspherical mirrors each having a convex shape. On the other hand, an aspherical mirror having a convex shape or an aspherical mirror having both a concave surface and a convex surface may be used. In the above embodiment, the first concave mirror 21 and the second concave mirror 22 are rotatable, but the third concave mirror 23 may also be rotatable.

Further, by automatically measuring the eye point EP using the image captured by the eye point measurement camera 31, the angles of the first concave mirror 21 and the second concave mirror 22, and thus the projection position P of the display image on the projection surface of the windshield WS can be automatically adjusted.

The present invention is not limited to the above embodiment and various modifications can be adopted within the scope of the present invention. For example, the present invention is not limited to the above embodiment, and may be appropriately modified, improved or the like. In addition, materials, shapes, sizes, numbers, arrangement places and the like of elements in the above-described embodiment are optional and not limited as long as the object of the present invention can be achieved.

For example, in the above embodiment, the eye point EP is automatically measured using the image captured by the eye point measurement camera 31, and the projection position P is automatically adjusted. On the other hand, instead of the eye point measurement camera 31, an input unit such as an adjustment lever that can be operated by the driver may be provided. In this case, by the driver operating the input unit, the projection position P can be manually adjusted such that the projection position P corresponding to the eye point EP of the driver can be obtained.

Further, in the above embodiment, the projection position P on the projection surface of the windshield WS is changed by changing the angles of both the first concave mirror 21 and the second concave mirror 22. On the other hand, the projection position P on the projection surface of the windshield WS may be changed by changing the angle of only one of the first concave mirror 21 and the second concave mirror 22.

Further, in the above embodiment, the optical system 20 includes the thermal cut-off filter 24 and the light shielding plate 25. On the other hand, one or both of the thermal cut-off filter 24 and the light shielding plate 25 may be omitted from the optical system 20.

According to an aspect of the embodiments described above, a projection display device (1) includes a display device (10), an optical system (20) configured to form a regular optical path (L1, L2, L3, and L4) to project light toward a projection position as a display image, the light being emitted from the display device, and a shielding plate (25) configured to prevent the light from reaching the projection position via a different optical path (Lg) different from the regular optical path. The optical system includes a first mirror (21) and a second mirror (22) provided on the regular optical path, the second mirrors (22) being configured to provide an optical path convergence point (C), at which the light converges, on the regular optical path, and the first mirrors (21) being provided at a position corresponding to the optical path convergence point. The projection display device (1) is configured such that a position of a mirror surface of at least one of the first mirror (21) and the second mirror (22) is adjustable in accordance with a position of an eye point (EP) of a user who visually recognizes the display image so as to project the light that has passed the optical path convergence point via the first mirror (21) and the second mirror (22) toward the projection position (P) that corresponds to the position of the eye point (EP). The shielding plate (25) is provided such that the shieling plate does not interfere with the regular optical path between the first mirror and the second mirror and such that the shielding plate interferes with the different optical path along which the light travels toward the projection position without being reflected by the pair of mirrors.

The optical system may further include an optical member (24) configured to perform an optical processing on the light at a position corresponding to the optical path convergence point.

The projection display device may further include at least one of a measuring unit (31) configured to measure the position of the eye point without the user performing the measurement and an input unit configured to receive an input indicative of the position of the eye point, the input unit being to be operated by the user.

The optical system may further include a third mirror different from the first mirror and the second mirror, the third mirror being disposed on the regular optical path. The shielding plate is provided such that the shielding plate does not interfere with the regular optical path between the pair of mirrors, such that the shielding plate does not interfere with the regular optical path between the third mirror and the pair of mirrors and such that the shielding plate interferes with the different optical path along which the light travels toward the third mirror without passing the pair of mirrors.

What is claimed is:

1. A projection display device comprises:
    a display device;
    an optical system configured to form a regular optical path to project light toward a projection position as a display image, the light being emitted from the display device; and a shielding plate configured to prevent the light from reaching the projection position via a different optical path different from the regular optical path,
    wherein the optical system comprises a first mirror and a second mirror provided on the regular optical path,
    wherein the regular optical path comprises:
        a first light path from the display device to the first mirror, and
        a second light path from the first mirror to the second mirror,
    wherein second light path has an optical path convergence point when viewed from the second mirror,
    wherein the first mirror is provided at a position corresponding to the optical path convergence point,
    wherein the projection display device is configured such that a position of a mirror surface of at least one of the first mirror and the second mirror is adjustable in accordance with a position of an eye point of a user who visually recognizes the display image so as to project the light that has passed the optical path convergence point via the first mirror and the second mirror toward the projection position that corresponds to the position of the eye point,
    wherein the shielding plate is provided such that the shieling plate does not interfere with the regular optical path between the first mirror and the second mirror and such that the shielding plate interferes with the different optical path along which the light travels toward the projection position without being reflected by the first mirror and the second mirror, and
    wherein the first mirror is a first concave mirror, and the second mirror is a second concave mirror.

2. The projection display device according to claim 1, wherein the optical system further comprises an optical member configured to perform an optical processing on the light at a position corresponding to the optical path convergence point.

3. The projection display device according to claim 1 further comprising:
    a measuring unit configured to measure the position of the eye point without the user performing the measurement.

4. The projection display device according to claim 1 further comprising:
    an input unit configured to receive an input indicative of the position of the eye point, the input unit being able to be operated by the user.

5. The projection display device according to claim 1 further comprising:
    a measuring unit configured to measure the position of the eye point without the user performing the measurement; and
    an input unit configured to receive an input indicative of the position of the eye point, the input unit being to be operated by the user.

6. The projection display device according to claim 1,
    wherein the optical system further comprises a third mirror different from the first mirror and the second mirror, the third mirror being disposed on the regular optical path, and
    wherein the shielding plate is provided such that the shieling plate does not interfere with the regular optical path between the first mirror and the second mirror, such that the shielding plate does not interfere with the regular optical path between the third mirror and the first mirror and the second mirror and such that the shielding plate interferes with the different optical path along which the light travels toward the third mirror without being reflected by the first mirror and the second mirror.

7. A projection display device comprises:
a display device; an optical system configured to form a regular optical path to project light toward a projection position as a display image, the light being emitted from the display device; and a shielding plate configured to prevent the light from reaching the projection position via a different optical path different from the regular optical path,
wherein the optical system comprises a first mirror and a second mirror provided on the regular optical path,
wherein the regular optical path comprises:
   a first light path from the display device to the first mirror, and
   a second light path from the first mirror to the second mirror,
wherein second light path has an optical path convergence point when viewed from the second mirror,
wherein the first mirror is provided at a position corresponding to the optical path convergence point,
wherein the projection display device is configured such that a position of a mirror surface of at least one of the first mirror and the second mirror is adjustable in accordance with a position of an eye point of a user who visually recognizes the display image so as to project the light that has passed the optical path convergence point via the first mirror and the second mirror toward the projection position that corresponds to the position of the eye point,
wherein the shielding plate is provided such that the shieling plate does not interfere with the regular optical path between the first mirror and the second mirror and such that the shielding plate interferes with the different optical path along which the light travels toward the projection position without being reflected by the first mirror and the second mirror,
wherein the optical system further comprises a third mirror different from the first mirror and the second mirror, and
wherein the shielding plate is provided between the second mirror and the third mirror.

8. A projection display device comprises:
a display device; an optical system configured to form a regular optical path to project light toward a projection position as a display image, the light being emitted from the display device; and a shielding plate configured to prevent the light from reaching the projection position via a different optical path different from the regular optical path,
wherein the optical system comprises a first mirror and a second mirror provided on the regular optical path,
wherein the regular optical path comprises:
   a first light path from the display device to the first mirror, and
   a second light path from the first mirror to the second mirror,
wherein second light path has an optical path convergence point when viewed from the second mirror,
wherein the first mirror is provided at a position corresponding to the optical path convergence point,
wherein the projection display device is configured such that a position of a mirror surface of at least one of the first mirror and the second mirror is adjustable in accordance with a position of an eye point of a user who visually recognizes the display image so as to project the light that has passed the optical path convergence point via the first mirror and the second mirror toward the projection position that corresponds to the position of the eye point,
wherein the shielding plate is provided such that the shieling plate does not interfere with the regular optical path between the first mirror and the second mirror and such that the shielding plate interferes with the different optical path along which the light travels toward the projection position without being reflected by the first mirror and the second mirror, and
wherein the projection display device is configured to adjust both the first mirror and the second mirror in accordance with the position of the eye point of the user who visually recognizes the display image.

9. The projection display device of claim 8, wherein the projection display device is configured to adjust the first mirror in an upward direction when the second mirror is adjusted in a downward direction, and
wherein the projection display device is configured to adjust the first mirror in the downward direction when the second mirror is adjusted in the upward direction.

* * * * *